(12) United States Patent
Sanders et al.

(10) Patent No.: US 11,494,351 B2
(45) Date of Patent: Nov. 8, 2022

(54) DEDUPLICATION OF ENCRYPTED DATA

(71) Applicant: International Business Machines Corporation, Armonk, NY (US)

(72) Inventors: Lee Jason Sanders, Chichester (GB); Gareth Paul Jones, Hampshire (GB); Ben Sasson, North Baddesley (GB); Gordon Douglas Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 16/864,649

(22) Filed: May 1, 2020

(65) Prior Publication Data

US 2021/0342318 A1 Nov. 4, 2021

(51) Int. Cl.
*G06F 16/215* (2019.01)
*H04L 9/14* (2006.01)
*H04L 9/08* (2006.01)

(52) U.S. Cl.
CPC .......... *G06F 16/215* (2019.01); *H04L 9/0891* (2013.01); *H04L 9/0894* (2013.01); *H04L 9/14* (2013.01)

(58) Field of Classification Search
CPC ... G06F 16/215; H04L 9/0891; H04L 9/0894; H04L 9/14
See application file for complete search history.

(56) References Cited

U.S. PATENT DOCUMENTS

| | | | |
|---|---|---|---|
| 8,199,911 B1 | 6/2012 | Tsaur | |
| 8,479,304 B1 | 7/2013 | Clifford | |
| 9,495,552 B2 | 11/2016 | El-Shimi | |
| 10,025,811 B2 | 7/2018 | Kim | |
| 11,044,118 B1* | 6/2021 | Reed | H04L 12/4633 |
| 11,088,998 B2* | 8/2021 | Guendert | H04B 10/25 |
| 11,221,778 B1* | 1/2022 | Miller | H03M 7/3093 |
| 11,295,028 B2* | 4/2022 | Hetzler | G06F 21/602 |
| 11,310,036 B2* | 4/2022 | Sczepczenski | H04L 63/0892 |
| 11,340,784 B1* | 5/2022 | Truong | G06F 3/0604 |
| 11,374,789 B2* | 6/2022 | Liguori | H04L 69/22 |
| 11,405,215 B2* | 8/2022 | Sczepczenski | H04L 67/1097 |
| 11,411,771 B1* | 8/2022 | Dawani | H04L 12/4641 |
| 2018/0107838 A1 | 4/2018 | Amarendran | |
| 2020/0119911 A1* | 4/2020 | Shemer | H04L 9/14 |
| 2020/0213109 A1* | 7/2020 | Perlman | G06F 16/174 |
| 2020/0320046 A1* | 10/2020 | Narayanamurthy | G06F 16/215 |

* cited by examiner

*Primary Examiner* — Yonas A Bayou
(74) *Attorney, Agent, or Firm* — Aaron N. Pontikos; Nicholas L. Cadmus

(57) ABSTRACT

A data storage system configured to deduplicate and store sets of data is presented. The system comprises a computer readable storage device configured to store a plurality of sets of data for a plurality of hosts, wherein each sets of data of the plurality of sets of data corresponding to each host of the plurality of hosts is encrypted with one or more different encryption keys, and wherein at least one of the plurality of sets of data contains deduplicated data. The system also comprises a key translator configured to create at least one translation key based, at least in part, on the one or more different encryption keys and the deduplicated data, and wherein the at least one translation key is configured to translate from a first encryption key to a second encryption key of the one or more different encryption keys.

20 Claims, 6 Drawing Sheets

DEDUPLICATION OF ENCRYPTED DATA

BACKGROUND OF THE INVENTION

The present invention relates generally to storing data in a storage system. In particular, the invention relates to storing encrypted and deduplicated data.

A common feature found in storage controllers and appliance's today is data deduplication. There is ever increasing demand to store more user data with the same physical capacity, this reduces the overall cost of ownership of the storage system. Data deduplication works by identifying repeated data patterns and instead of storing the user data, it will create a reference to the duplicate data that is stored elsewhere in the system. It maybe that the existing duplicate is within the same volume, another volume (either in the same pool or another pool) within the storage system, or a volume used by another host. Use cases for data duplication are such as, a virtual machine boot operating system image that is used by multiple hosts, in this case the host operating system may well be the same version and therefore it'll be a waste to store N copies of that data. The granularity of deduplication can differ between storage products typically it will be small such as 8K bytes and the scope of the deduplication will be at a volume or storage pool level.

As the demand to store more data increases, systems ever increasingly need to be available online, therefore data security is ever increasingly becoming more important. To satisfy this demand, end-to-end encryption is employed to protect against data falling into the wrong hands due to hacking, storage devices being relocated or misplaced, man-in-the-middle attacks etc. Data may be encrypted at the application and written through the storage controller to the backend storage

SUMMARY

The present invention relates to a data storage system configured to deduplicate and store sets of data. The system comprises a computer readable storage device configured to store a plurality of sets of data for a plurality of hosts, wherein each sets of data of the plurality of sets of data corresponding to each host of the plurality of hosts is encrypted with one or more different encryption keys, and wherein at least one of the plurality of sets of data contains deduplicated data. The system also comprises a key translator configured to create at least one translation key based, at least in part, on the one or more different encryption keys and the deduplicated data, and wherein the at least one translation key is configured to translate from a first encryption key to a second encryption key of the one or more different encryption keys.

The present invention also relates to a computer-implemented method for deduplicating and storing sets of data, the method comprises: storing a plurality of sets of data for a plurality of hosts, wherein each sets of data of the plurality of sets of data corresponding to each host of the plurality of hosts is encrypted with one or more different encryption keys, and wherein at least one of the plurality of sets of data contains deduplicated data; and creating at least one translation key based, at least in part, on the one or more different encryption keys and the deduplicated data, and wherein the at least one translation key is configured to translate from a first encryption key to a second encryption key of the one or more different encryption keys.

These and other aspects of the invention will be apparent from and elucidated with reference to the embodiment(s) described hereinafter.

DETAILED DESCRIPTION

Figure 1:
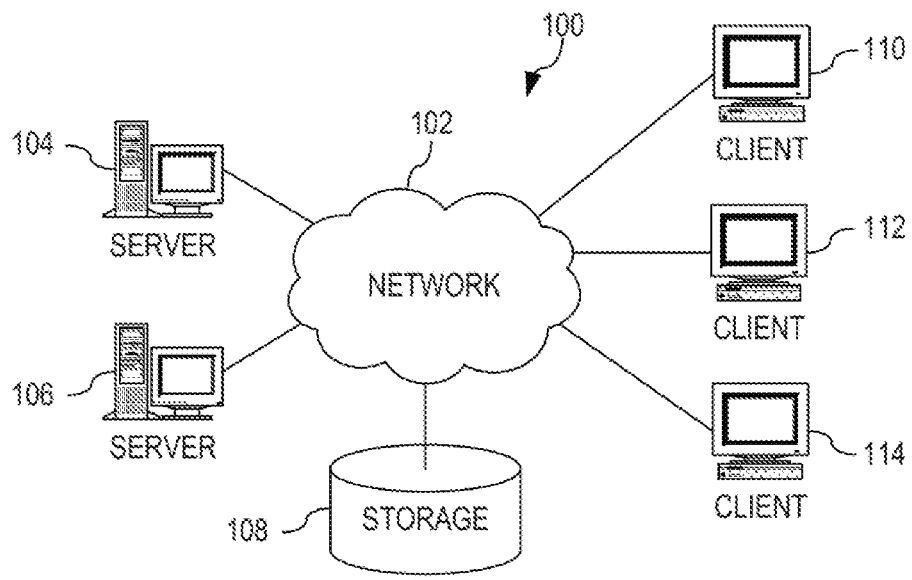
FIG. 1 depicts a pictorial representation of an example distributed system in which aspects of the illustrative embodiments may be implemented.

To protect against this, end-to-end encryption is employed. Data is encrypted at the application and written through the storage controller to the backend storage.

However, end-to-end encryption and deduplication are mutually exclusive where different encryption algorithms are required and the unencrypted version of the data is identical. The storage device cannot deduplicate the encrypted data because it is different, even though the unencrypted version of the data is identical. Encrypted data to the human eye appears to be random data, applications writing encrypted data through a de-duplicating storage device means that the data becomes un-deduplicable therefore negating any advantages of space savings. In particular, where multiple volumes are storing data using different encryption keys on the same storage device in a multi tenancy environment, since a first system cannot decrypt the data from a second system as each system does not know the keys of each other system.

Some systems which allow encryption with different encryption algorithms and deduplication in a storage device require the data to be decrypted first, then deduplicated, and then re-encrypted, or they translate data encrypted with different keys to be encrypted with a single key so that it can be deduplicated. However, these approaches place the storage device into the trusted chain.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Computer readable storage devices allow stored data to be read and new data to be written into the device. In certain applications it is likely that the data stored in the storage device may have duplicates. For example, a company may store many files which include the same header and footer. Data deduplication allows the repeated byte patterns (chunks) at a certain chunk size to be stored only once. The rest of the instances of the chunk in the storage device include a deduplication link to the original deduplicate data.

However, encryption can significantly reduce the advantages of deduplication. When a file is encrypted with a key, the encrypted data appears random. If the same file is encrypted with a different key, the encrypted data will appear different and random. Thus, the same file encrypted with two different keys appears unable to be deduplicated.

Embodiments propose a data storage system configured to deduplicate and store sets of data, the system comprising a computer readable storage device configured to store a plurality of sets of data for a plurality of hosts, wherein each set of data corresponding to a host is encrypted with a different encryption key, and wherein at least one set of data contains deduplicated data; and a key translator configured to create at least one translation key based on the different encryptions keys and the deduplicated data, and wherein a translation key is configured to translate from a first encryption key to a second encryption key of the different encryption keys.

Typically, encrypted data is difficult to deduplicate due to the random nature of encrypted data. However, based on, for example, a deduplication database with hashes corresponding to unencrypted data, a storage device can determine whether a file can be deduplicated or not, even when the data in the storage device is encrypted with different keys. Thus, a file for a first host can be deduplicated based on the same file from a second host.

However, the file for the second host is encrypted with the key of the second host and cannot be decrypted by the first host. Thus, it seems the first host cannot read the deduplicated file.

The inventors have realised that data encrypted with one encryption key can be translated externally from the storage device to encryption with a different key with a translator. By using a translator, the file can now be translated from being encrypted with a first encryption algorithm (with a first key), to being encrypted with a second encryption algorithm (with a second encryption key). Thus, a first host with a first encryption key can read the data, and a second host with a second encryption key can also read the data (by translating), even though the data is only stored once (encrypted with the first encryption algorithm). By having the translator external to the storage device, the translator can be configured to not be able to read data, only translate data, and thus it avoids being compromised. Additionally, the data may be translated directly from one encryption to another and avoid being un-encrypted during the translation process.

Thus, the key translator allows encrypted data to be stored in a storage device by many different hosts with different encryption keys, and further allows the data to be deduplicated to save space in the storage device.

Embodiments of the invention also enable a data storage system, wherein the computer readable storage device comprises a storage controller configured to: create deduplication links; receive read and write instructions from a host; and send instructions to the key translator. The computer readable storage may also comprise a physical storage configured to store the deduplicated data.

Embodiments of the invention also enable the instructions sent to the key translator to translate the deduplicated data with the corresponding translation key.

The key translator may be external from the computer readable storage device. If the deduplicated data is translated at the key translator, then the storage device has no access to unencrypted data and thus does not need to form part of the trusted chain. The translator may be developed such that the key translator cannot read arbitrary data, and thus is unable to expose data if compromised.

Embodiments of the invention enable the translation key to be based on symmetric encryption keys.

For example, an XOR cipher is a simple cipher which would minimise the processing power necessary to create the translation keys. Alternatively, any type of stream cipher, block cipher (e.g. the advanced encryption algorithm AES algorithm) or reciprocal ciphers may be used.

Embodiments of the invention enable the translation key to be based on decrypting the deduplicated data with an original key, and subsequently re-encrypting the deduplicated data with an encryption key, wherein the original key is used to decrypt the deduplicated data and the encryption key is used to encrypt data by the host sending the read instructions.

Embodiments of the invention enable the key translator to be further configured to re-salt the deduplicated data following the duplicated data being translated with the translation key.

The key translator can re-salt the deduplicated data after applying the translation key, such that the host does not have any information about the original salt.

Embodiments of the invention also enable the instructions sent to the key translator to be to send the corresponding translation key to the storage controller, wherein the storage controller is configured to translate the duplicated data with the translation key.

The key translator may send the translation key to the storage controller, instead of applying the translation key at the key translator. This avoids transferring all the deduplication data to the key translator. This reduces network bandwidth, as the encrypted file does not have to be sent to the translator, only the translation key has to be sent from the translator to the storage controller.

Embodiments of the invention also enable the storage controller to be further configured to store a metadata database, wherein the metadata database stores information on the physical location of data in the physical storage. The metadata database can store the deduplication links and the physical location of the stored data, as well as other information such as type of data, date of storing, last time data was read and other information regarding the data.

Embodiments of the invention also enable the storage controller to be further configured to store a deduplication database, wherein the deduplication database stores information on which data has been deduplicated. The deduplication database can, for example, store hashes of all of the files stored before they were encrypted, such that each hash corresponds to unencrypted data (e.g. a whole file or part of a file). When a host wants to store further data on the storage device, a hash (or hashes) can be created for the data and compared to the hashes stored in the deduplication database. If the hash already exists, the data corresponding to the hash can be deduplicated (e.g. a deduplication link can be created).

Embodiments of the invention also enable the key translator to be further configured to hash encrypted data when the storage controller receives a write instruction for the encrypted data, and wherein the hash is used by the storage controller to determine whether the encrypted data can be deduplicated based on the deduplication database.

If the host is unable to provide a hash of the unencrypted data. (i.e. the host is providing only the encrypted data), the storage controller can use an encrypted dummy key that is only known by the storage controller. The data encrypted dummy key is a key that is only known by the storage controller, but internally encrypted within the storage controller. In this way, the data can still be deduplicated and the key translator can translate the data using the dummy key.

Embodiments of the invention also enable the key translator to further comprise a load balancer. A load balancer may prevent the key translator from becoming a bottleneck.

According to another aspect of the invention, there is provided a computer-implemented method for deduplicating and storing sets of data, the method comprising: storing a plurality of sets of data for a plurality of hosts, wherein each set of data corresponding to a host is encrypted with a different encryption key, and wherein at least one set of data contains deduplicated data; and creating at least one translation key based on the different encryptions keys and the deduplicated data, and wherein a translation key is configured to translate from a first encryption key to a second encryption key of the different encryption keys.

Deduplication of encrypted data is possible if each host provides a hash over the unencrypted data. The hash for a file would be the same for any host, even if the encrypted data of the file looks different for each host. In an example, if each host had the same key, then the encrypted data would look the same for each host deduplication would be possible. However, if the keys are different for each host, deduplication may be possible when writing the data, but only one host would be able to decrypt the deduplicated file.

The translation key allows the deduplicated file to be translated between different encryption keys. When a host sends a read instruction and receives a deduplication link, the encrypted deduplicated data may be sent to a key translator, where the encryption is changed from the original key (first key) to the read/write key (second key) from the host which sent the read instruction. The read/write key may depend on whether the encryption is symmetric or asymmetric. The translated deduplicated data is then sent to the host, wherein the host is then able to decrypt the data with their own read key.

Storing a plurality of sets of data, wherein at least one set of data contains deduplicated data, may be based on receiving a write instruction, encrypted data and a hash corresponding to un-encrypted data from a host with a corresponding encryption key and decryption key and checking whether the hash exists in a deduplication database. Based on the hash existing, creating a deduplication link in a metadata database and based on the hash not existing: updating the deduplication database with the hash; writing the encrypted data in a physical storage; and updating the metadata database with the location of the encrypted data in the physical storage.

Creating a translation key may be based on applying symmetric encryption keys.

Creating the translation key may be based on decrypting the deduplicated data with the original key and re-encrypting the deduplicated data with the encryption key, wherein the original key is used to decrypt the deduplicated data and the encryption key is used to encrypt data by the host sending a read instructions.

The method for deduplicating and storing sets of data may further comprise re-salting the deduplicated data following the duplicated data being translated with the translation key.

The deduplicated data may be stored in a computer readable storage device and the translation key is created in a key translator.

The method for deduplicating and storing sets of data may further comprise sending the deduplication data from the computer readable storage device to the key translator based on receiving a read instruction for the deduplication data from a host and translating the deduplication data with the translation key.

The method for deduplicating and storing sets of data may further comprise sending the translation key from the key translator to the computer readable storage device based on receiving a read instruction for the deduplication data from a host and translating the deduplication data with the translation key.

The method for deduplicating and storing sets of data may further comprise further comprising hashing encrypted data at the key translator when the storage controller receives a write instruction for the encrypted data, and wherein the hash is used by the storage controller to determine whether the encrypted data can be deduplicated based on the deduplication database.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed data processing system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage system 108 which may, for example, comprise a RAID storage array formed of a plurality of storage units. However, other storage systems are envisaged. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

The distributed data processing system 100 may be configured to perform one or more methods according to an embodiment of the invention, e.g. to control the storage of write data within the storage system 108 utilizing network 102 and other systems discussed below.

Figure 2:
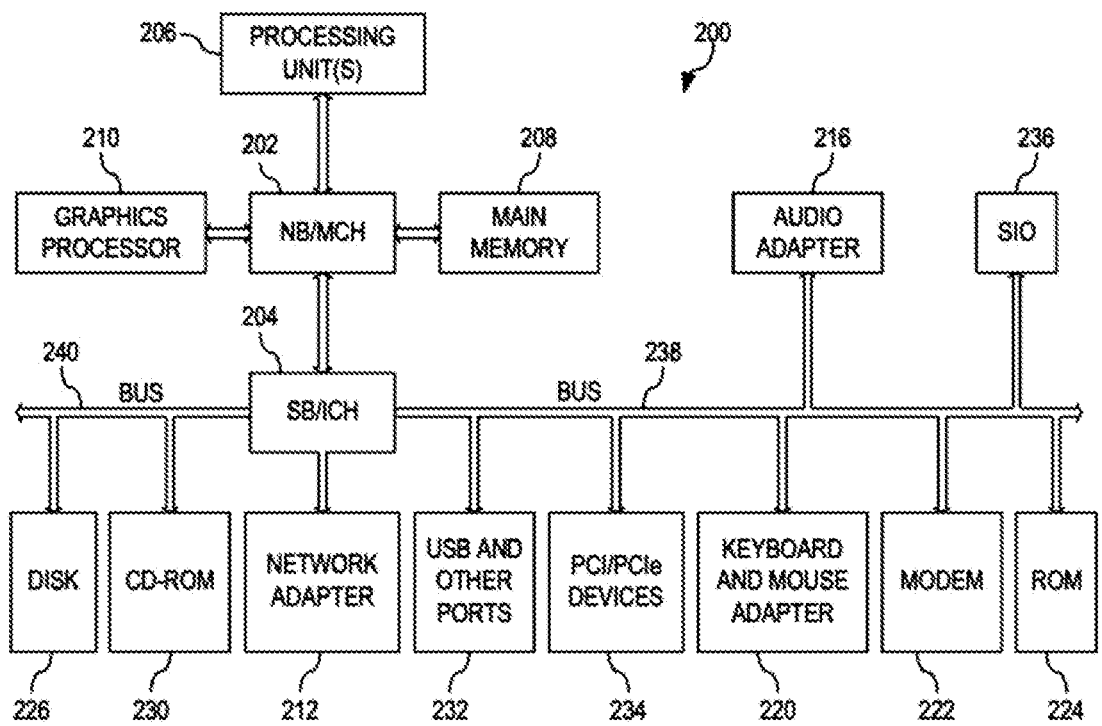
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, the system 200 may be configured to implement an identifying unit, an associating unit, and a creating unit according to an embodiment.

In the depicted example, the system 200 employs a hub architecture including a north bridge and memory controller hub (NB/MCH) 202 and a south bridge and input/output (I/O) controller hub (SB/ICH) 204. A processing system 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing system 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing system 206. Alternatively, a single processor system may be employed.

Instructions for the operating system, the programming system, and applications or programs are located on storage devices, such as HDD 226, and may be loaded into main memory 208 for execution by processing system 206. Similarly, one or more message processing programs according to an embodiment may be adapted to be stored by the storage devices and/or the main memory 208.

The processes for illustrative embodiments of the present invention may be performed by processing system 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
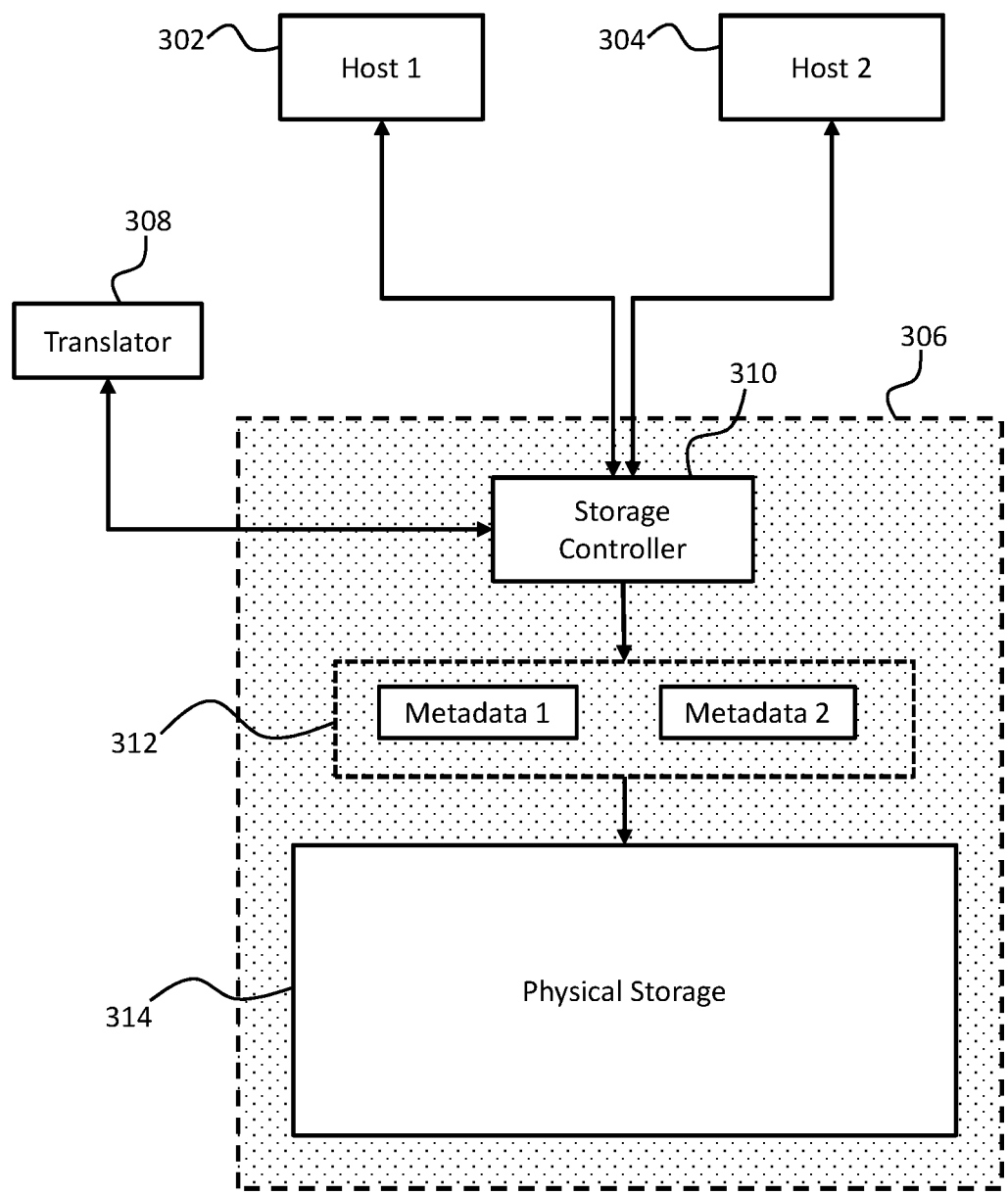
FIG. 3 is a simplified block diagram of an exemplary embodiment of a storage system for storing encrypted and deduplicated data.

FIG. 3 is a simplified block diagram of an exemplary embodiment of a storage system for storing encrypted and deduplicated data. The computer readable storage device 306 may be storing data for two hosts, a first host 302 and a second host 304. The storage device 306 may include a metadata database 312 and a physical storage 314 for storing the data for each one of the hosts, as well as a storage controller 310 for receiving instructions from the hosts. The translator 308 is for translating data from a first encrypting key (corresponding to the first host 302) to a second encryption key (corresponding to the second host 304) or vice-versa.

Figure 4:
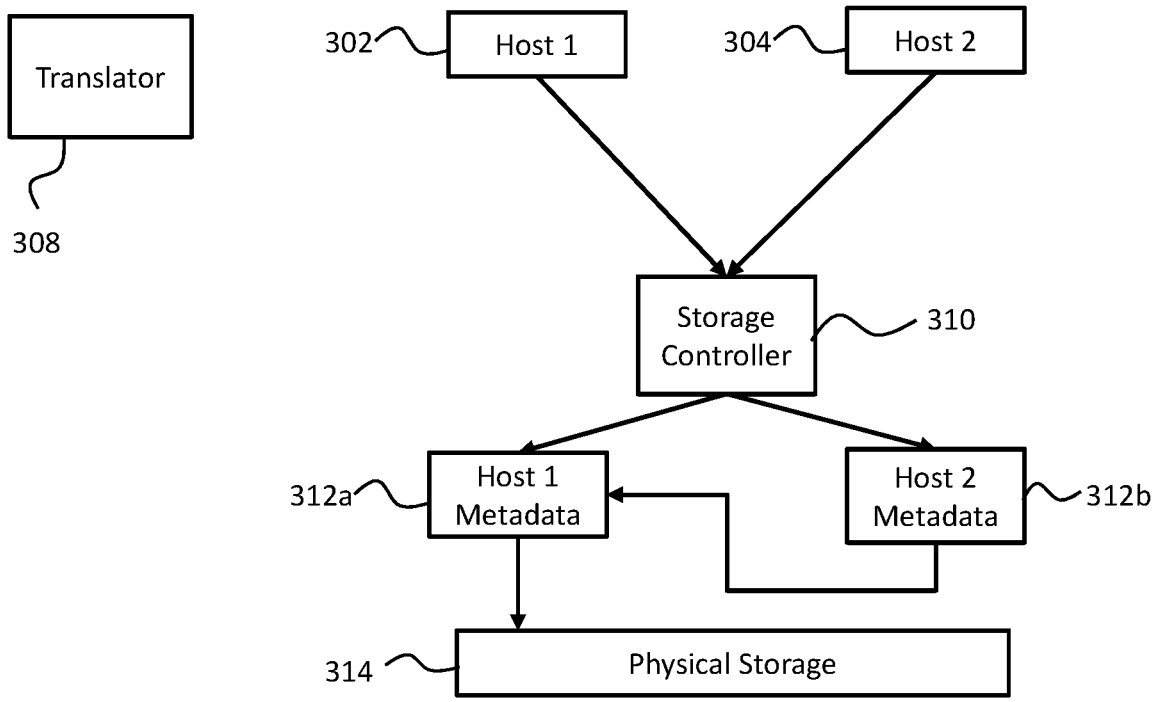
FIG. 4 shows a block diagram of an exemplary embodiment of a system for storing encrypted and deduplicated data performing a write instruction.

FIG. 4 shows a block diagram of an exemplary embodiment of a system for storing encrypted and deduplicated data performing a write instruction. Host one 302 performs a write, encrypted using key=k1 and sending hash=h1. The storage controller 310 updates the host one metadata 312a and stores the hash=h1 in a deduplication database. The data is then written to the physical media 314 in encrypted form, wherein the host one metadata 312a points to the physical address of the data.

Host two 304 then performs a write for the same data, encrypted using key=k2 and sending hash=h1. The storage controller 310 detects that the hash=h1 is already stored in the physical storage 314 and updates the host two metadata 312*b* with a deduplication link that points to the host one metadata 312*a* which contains the pointer to the physical address of the data.

Figure 5:
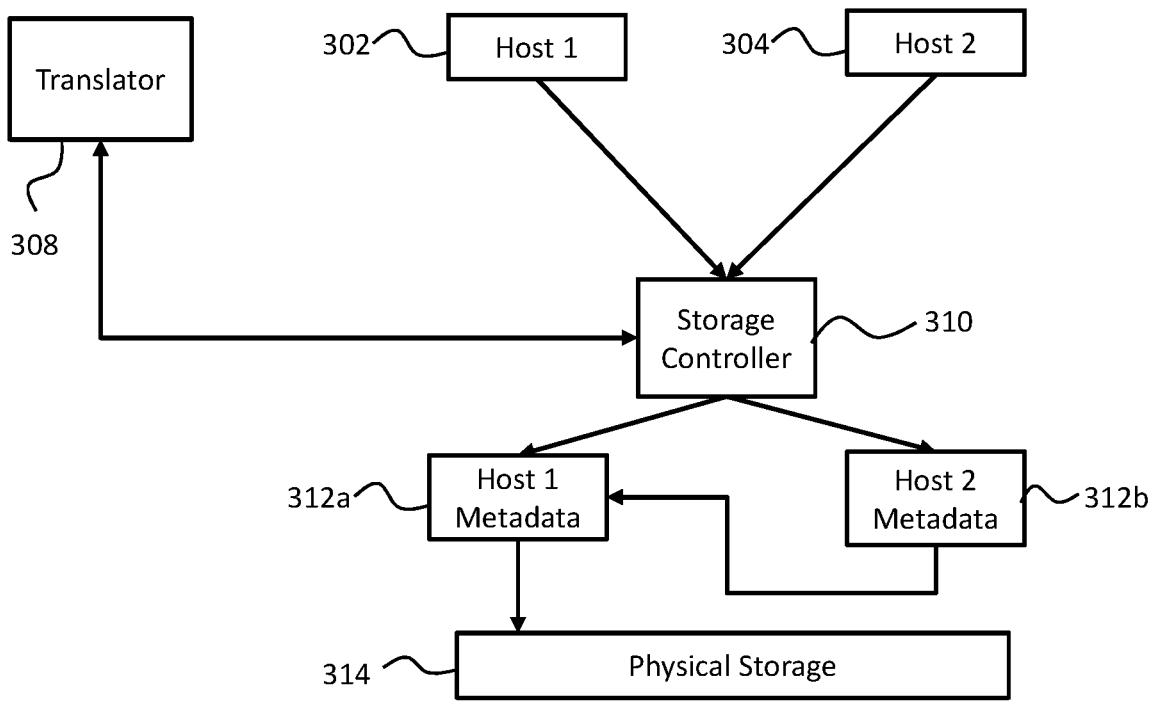
FIG. 5 shows a block diagram of an exemplary embodiment of a system for storing encrypted and deduplicated data performing a read instruction.

FIG. 5 shows a block diagram of an exemplary embodiment of a system for storing encrypted and deduplicated data performing a read instruction.

If host one 302 performs the read instruction, the storage controller 310 performs a lookup in the host one metadata 312*a* and retrieves the physical address of the data. The encrypted data is then read from the physical storage 314 and returned to host one 302.

If host two 304 performs the read instruction, the storage controller 310 performs a lookup in the host two metadata 312*b*. In this case, the storage controller 310 may retrieve a deduplication link pointing to the host one metadata 312*a*. The storage controller 310 follows the deduplication link and retrieves the data, but the data is encrypted using key=k1. The storage controller 310 thus requests the data to be translated from k1 to k2 by the key translator 308. The key translator 308 can translate the data and return the translated data to host two 304.

Figure 6:
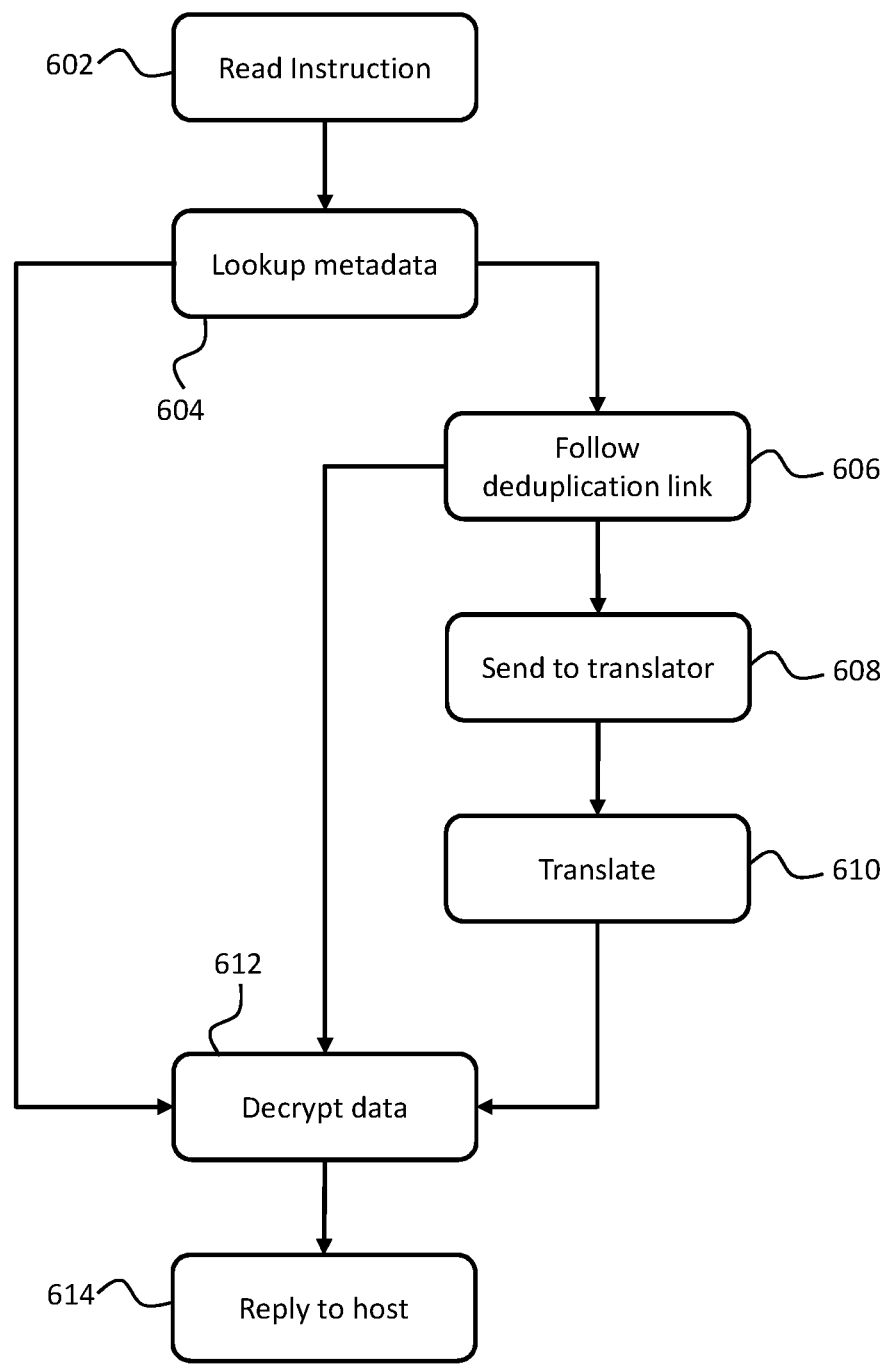
FIG. 6 is a flow diagram of a computer implemented method for reading data from a computer readable storage device.

FIG. 6 is a flow diagram of a computer-implemented method for reading data from a computer readable storage device 306. Based on the storage controller receiving a read instruction from 602, for example, the second host, the storage controller performs a lookup on the metadata 604 for the second host. If the lookup returns a deduplication link to follow 606, the deduplication link may be a link to the metadata from the first host, or from the second host. If the lookup returns a pointer to physical data in the physical storage, then the storage controller retrieves the data from the physical storage and may decrypt the data 612 with the key from the second host.

In this case, the data is sent to the translator 608, where the translator can translate data encrypted with one encryption key to data encrypted with a second encryption key 610. Thus, the storage controller receives, from the translator, the same data but encrypted with the key of the second host.

If the link is to the metadata for the second host, then the key from the second host can still be used to decrypt the data 612. If the deduplication link is to the metadata for the first host, then the storage controller can retrieve the data from the physical storage but cannot decrypt the data with the key of the second host. Thus, the storage controller receives, from the translator, the same data but encrypted with the key of the second host. Thus, the data can now be decrypted 612 by the second host, even if the data was only originally stored encrypted with the first encryption key. Once the data is decrypted, it can be sent to the host 614.

The system may work the same with any number of hosts. In the case off many hosts, the translator would contain a plurality of translation keys configured to translate between any first key and any second key belonging the plurality of hosts.

Figure 7:
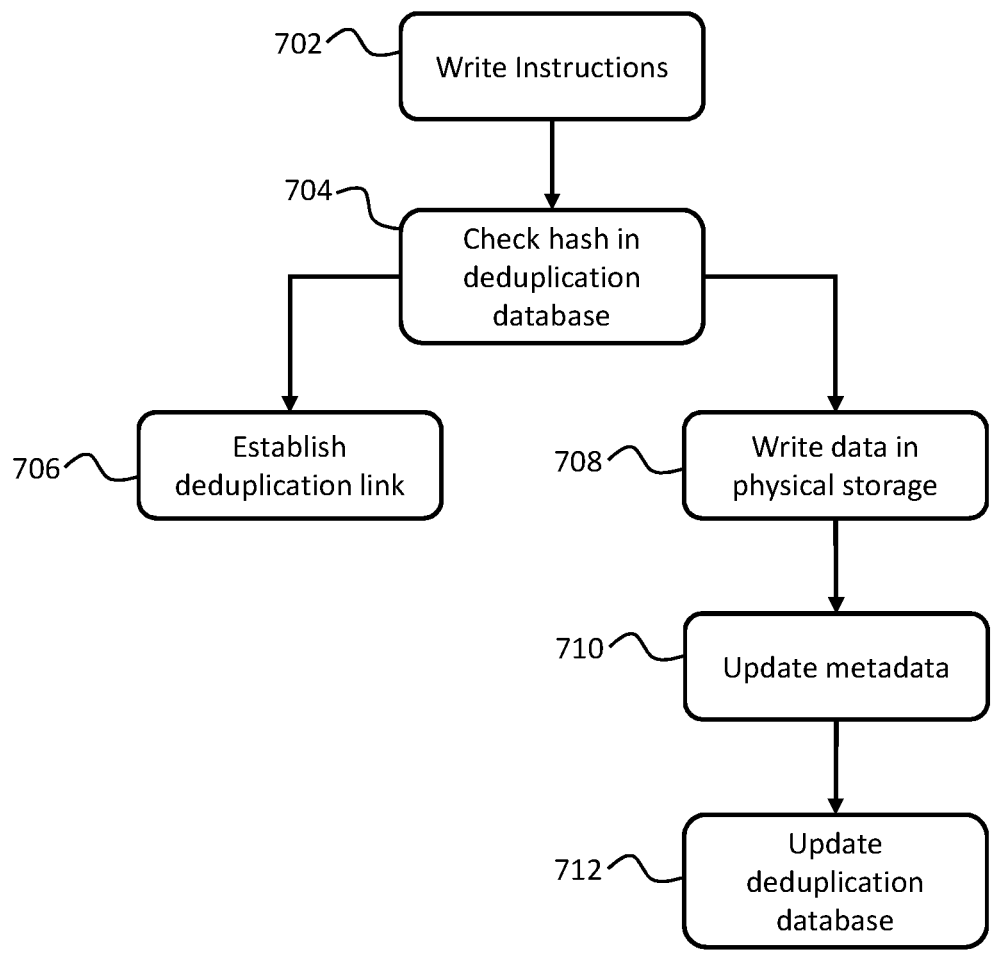
FIG. 7 is a flow diagram of a computer implemented method for writing data to a computer readable storage device.

FIG. 7 is a flow diagram of a computer-implemented method for writing data to a computer readable storage device 306. Based on the storage controller receiving a write instruction for a set of data 702, the storage controller would check for the hash corresponding to the set of data in a deduplication database 704. If the hash is found in the deduplication database, then a deduplication link may be established 706 in the metadata database.

However, if the hash is not found in the deduplication database, then the set of data can be written in the physical storage 708, the metadata database is updated with the key description and physical location 710, and the deduplication database is updated with the hash 712.

The storage system will use a host-provided hash to deduplicate encrypted data and, if returned as a response to a read from a different location and/or volume, will consult an external translator 308 that allows the re-encryption of the data using an alternative key that would make sense to the receiving component.

Figure 8:
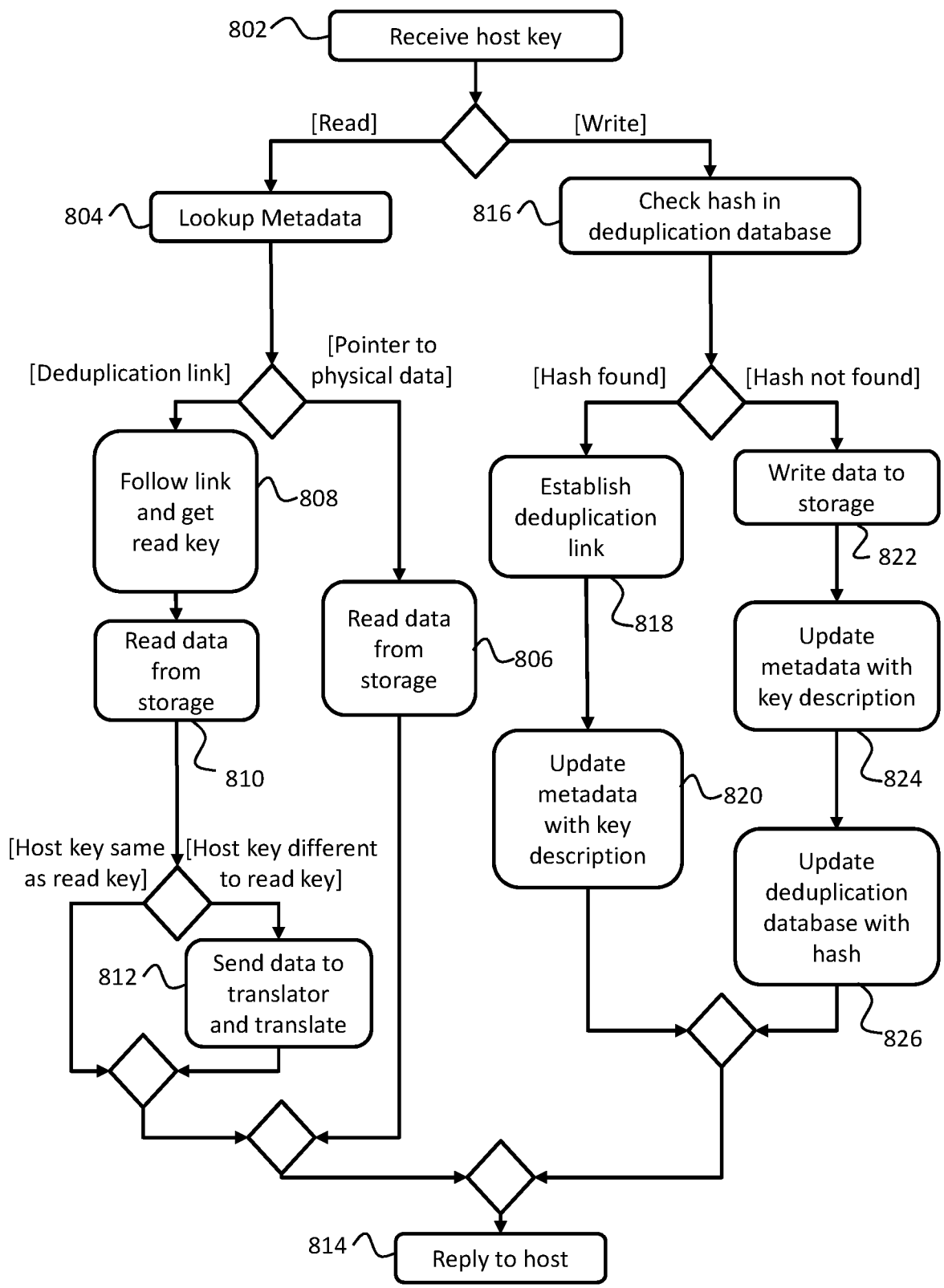
FIG. 8 is a flow diagram of a computer implemented method for reading and writing data to a computer readable storage device.

FIG. 8 is a flow diagram of a computer-implemented method for reading and writing data to a computer readable storage device 306. The instruction is sent by the host with a host key (step 802). If the instruction is a read instruction, then a lookup is performed on the metadata database (step 804). The lookup can return a deduplication link or a pointer to physical data.

If the lookup returns a pointer to the physical data, then the data can be read from the physical storage (step 806) and a reply can be sent to the host with the data (step 814).

However, if the lookup returns a deduplication link, the link is followed and the read key for the data is obtained (step 808). The data is then read from the storage (810). If the host key is the same as the read key, then the data can be sent to the host (step 814). If the host key is not the same as the read key, then the data is sent to the translator to translate it to the encryption of the host who provided the read instruction (step 812). Once the data is translated, it can be sent to the host (step 814).

If the instruction sent is a write instruction, the hash of the data is checked in the deduplication database (step 816). If the hash is found, a deduplication link is established (step 818) and the metadata database is updated with the write key description (step 820). If the hash is not found, then the data is written on the physical storage (step 822), the metadata database is updated with the key description (step 824) and the deduplication database is updated with the hash (step 826).

Exemplary implementations of the key translator 308 are described below:

For symmetric encryptions, the translator 308 could create a translation key that allows transforming of data between key=1 and key=2 without ever having a clear data available. An example would be a XOR encryption in which the translator 308 has to keep the translation keys but doesn't need to have access to keys used to decipher the data.

A more sophisticated translator 308 is also possible, once that has access to all keys present in the system and is capable to decrypt and re-encrypt using the correct key. In this implementation the translator 308 could optionally re-salt the data to avoid having to tell the host information about the original salt.

Another possible implementation is for the translator 308 to send the translation key back to the storage controller 310 rather than the translated data, this has the advantage reducing network bandwidth but implies the storage controller 310 is capable of translating the data between keys.

An important aspect of the translator 308 is that it is external to the storage controller 310 and prevents from the controller 310 from having access to the un-encrypted data if the storage device 306 and/or media have been compromised. On the other hand, since the translator 308 can't by itself read arbitrary data, it is unable to expose data on demand if compromised.

In cases where the host is unable to generate a hash, the translator 308 can play an additional role in which it translates the encrypted data to a data encrypted dummy key and then hashes it, this hash is then used for deduplication purposes allowing integration in more diverse environments.

Furthermore, since the translator 308 is a stateless service implementation can trivially include a load balancer to prevent translator 308 from becoming a bottleneck.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system configured to deduplicate and store sets of data, the system comprising:
   one or more computer processors and a computer readable storage device stored on at least one of the one or more computer processors;
   the computer readable storage device configured to store a plurality of sets of data for a plurality of hosts, wherein each set of data of the plurality of sets of data corresponding to each host of the plurality of hosts is encrypted with one or more different encryption keys, wherein at least one of the plurality of sets of data includes deduplicated data, and further wherein the storing is based, at least in part, on:
     receiving a write instruction, encrypted data, and a hash corresponding to un-encrypted data from at least one host of the plurality of hosts with a corresponding encryption key and decryption key;
     creating a deduplication link in a metadata database corresponding to the received hash; and
   create at least one translation key based, at least in part, on the one or more different encryption keys and the deduplicated data, wherein the at least one translation key is configured to translate from a first encryption key to a second encryption key of the one or more different encryption keys.

2. The system of claim 1, wherein the computer readable storage device comprises:
   a storage controller configured to:
     create deduplication links;
     receive read and write instructions from a host; and
     send instructions to the key translator, and
   a physical storage configured to store the deduplicated data.

3. The system of claim 2, wherein instructions sent to the key translator are to translate the deduplicated data with the at least one translation key.

4. The system of claim 3, wherein the at least one translation key is based on symmetric encryptions keys.

5. The system of claim 3, wherein the at least one translation key is based on decrypting the deduplicated data with an original key, and subsequently re-encrypting the deduplicated data with an encryption key, wherein the original key is used to decrypt the deduplicated data and the encryption key is used to encrypt data by the plurality of hosts sending read instructions.

6. The system of claim 5, wherein the key translator is further configured to re-salt the deduplicated data following the duplicated data being translated with the at least one translation key.

7. The system of claim 2, wherein instructions sent to the key translator are to send the at least one translation key to the storage controller, and wherein the storage controller is configured to translate the duplicated data with the at least one translation key.

8. The system of claim 2, wherein the storage controller is further configured to store a metadata database, wherein the metadata database is configured to store information on a physical location of data in a physical storage device.

9. The system of claim 2, wherein the storage controller is further configured to store a deduplication database, wherein the deduplication database is configured to store information on data that has been deduplicated.

10. The system of claim 9, wherein the key translator is further configured to hash encrypted data when the storage controller receives a write instruction for the encrypted data, and wherein the hash is used by the storage controller to determine whether the encrypted data can be deduplicated based on the deduplication database.

11. The system of claim 1, wherein the key translator further comprises a load balancer.

12. A computer-implemented method for deduplicating and storing sets of data, the method comprising:
   storing a plurality of sets of data for a plurality of hosts, wherein each set of data of the plurality of sets of data corresponding to each host of the plurality of hosts is encrypted with one or more different encryption keys, wherein at least one of the plurality of sets of data includes deduplicated data, and further wherein the storing is based, at least in part, on:
     receiving a write instruction, encrypted data, and a hash corresponding to un-encrypted data from at least one host of the plurality of hosts with a corresponding encryption key and decryption key;
     creating a deduplication link in a metadata database corresponding to the received hash; and
   creating at least one translation key based, at least in part, on the one or more different encryption keys and the deduplicated data, wherein the at least one translation key is configured to translate from a first encryption key to a second encryption key of the one or more different encryption keys.

13. The method of claim 12, wherein storing the plurality of sets of data, wherein at least one set of data of the plurality of sets of data contains deduplicated data, is based, at least in part on:
   checking whether the hash exists in a deduplication database; and
   responsive to a determination that the hash does not exist:
     updating the deduplication database with the hash;
     writing the encrypted data in a physical storage; and
     updating the metadata database with a location of the encrypted data in a physical storage device.

14. The method of claim 12, wherein creating the at least one translation key is based on symmetric encryption keys.

15. The method of claim 12, wherein creating the at least one translation key is based on decrypting the deduplicated data with an original key, and subsequently re-encrypting the deduplicated data with an encryption key, wherein the original key is used to decrypt the deduplicated data and the encryption key is used to encrypt data by the plurality of hosts sending read instructions.

16. The method of claim 15, further comprising re-salting the deduplicated data following the duplicated data being translated with the at least one translation key.

17. The method of claim 12, wherein the deduplicated data is stored in a computer readable storage device and the at least one translation key is created in a key translator.

18. The method of claim 17, further comprising:
sending the deduplication data from the computer readable storage device to the key translator based on receiving a read instruction for the deduplication data from a host of the plurality of hosts; and
translating the deduplication data with the at least one translation key.

19. A computer program product for deduplicating and storing sets of data, the computer program product comprising:
one or more computer readable storage devices and program instructions stored on the one or more computer readable storage devices, the program instructions comprising:
program instructions executable for storing a plurality of sets of data for a plurality of hosts, wherein each set of data of the plurality of sets of data corresponding to each host of the plurality of hosts is encrypted with one or more different encryption keys, wherein at least one of the plurality of sets of data includes deduplicated data and further wherein the storing is based, at least in part, on:
receiving a write instruction, encrypted data, and a hash corresponding to un-encrypted data from at least one host of the plurality of hosts with a corresponding encryption key and decryption key;
creating a deduplication link in a metadata database corresponding to the received hash; and
program instructions executable for creating at least one translation key based, at least in part, on the one or more different encryption keys and the deduplicated data, wherein the at least one translation key is configured to translate from a first encryption key to a second encryption key of the one or more different encryption keys.

20. The computer program product of claim 19, wherein the one or more computer readable storage devices further comprise:
at least one storage controller configured to:
create deduplication links;
receive read and write instructions from a host; and
send instructions to the key translator, and
a physical storage device configured to store the deduplicated data.

* * * * *